US012323847B2

(12) United States Patent
Ohashi

(10) Patent No.: US 12,323,847 B2
(45) Date of Patent: *Jun. 3, 2025

(54) COMMUNICATION SYSTEM, VEHICLE, SERVER, METHOD FOR CONTROLLING VEHICLE, AND NON-TRANSITORY STORAGE MEDIUM

(71) Applicant: TOYOTA JIDOSHA KABUSHIKI KAISHA, Toyota (JP)

(72) Inventor: Kosuke Ohashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/633,661

(22) Filed: Apr. 12, 2024

(65) Prior Publication Data

US 2024/0259855 A1  Aug. 1, 2024

Related U.S. Application Data

(63) Continuation of application No. 18/171,758, filed on Feb. 21, 2023, now Pat. No. 11,985,532.

(30) Foreign Application Priority Data

Apr. 28, 2022 (JP) ................. 2022-074153

(51) Int. Cl.
 *H04L 12/00* (2006.01)
 *H04W 28/02* (2009.01)
(52) U.S. Cl.
 CPC ............... *H04W 28/0226* (2013.01)
(58) Field of Classification Search
 CPC ......... H04L 69/40; H04L 67/34; H04L 67/52; H04L 67/142; H04L 67/12; H04L 12/40;
 (Continued)

(56) References Cited

U.S. PATENT DOCUMENTS 8,160,764 B2  4/2012  Choi et al.
9,953,535 B1  4/2018  Canavor et al.
(Continued)

FOREIGN PATENT DOCUMENTS

EP  3565261 A1  11/2019
JP  2004282456 A  10/2004
(Continued)

OTHER PUBLICATIONS

Kosuke Ohashi, U.S. Appl. No. 18/171,758, filed Feb. 21, 2023.
(Continued)

*Primary Examiner* — Frantz Coby
(74) *Attorney, Agent, or Firm* — Dickinson Wright, PLLC

(57) ABSTRACT

A communication system includes: a communication device configured to communicate with a server external to a vehicle; and a control device. The control device is configured to: control the communication device to receive predetermined data from the server while the vehicle is traveling along a travel route to a destination; acquire first and second ranges among the travel route; control the communication device to receive the data while the vehicle is traveling in the first range; and control the communication device in such a way that an interruption process is completed before the vehicle travels in the second range. The first range is a range where the data is received. The second range is a range where the data is not received. The interruption process is a process of interrupting the reception of the data in a resumable state.

20 Claims, 6 Drawing Sheets

(58) Field of Classification Search
CPC ........ H04L 2012/40273; H04W 4/021; H04W 4/40; H04W 28/26; H04W 8/245; H04W 76/19; H04W 4/029; H04W 4/44; B60W 2556/45; B60W 50/0098; B60W 30/10; B60W 2050/0005; G01C 21/34
USPC .......................................................... 709/219
See application file for complete search history.

(56) References Cited

U.S. PATENT DOCUMENTS

| | | | |
|---|---|---|---|
| 10,223,919 | B2 | 3/2019 | Bai et al. |
| 11,985,532 | B2* | 5/2024 | Ohashi .................. G01C 21/34 |
| 2003/0223142 | A1 | 12/2003 | Mizuhiki et al. |
| 2004/0077362 | A1 | 4/2004 | Chinomi et al. |
| 2009/0149161 | A1 | 6/2009 | Kang |
| 2010/0111039 | A1 | 5/2010 | Kim et al. |
| 2011/0167128 | A1 | 7/2011 | Raghunathan et al. |
| 2018/0321047 | A1 | 11/2018 | Sagawa |
| 2019/0107406 | A1 | 4/2019 | Cox et al. |
| 2023/0186766 | A1 | 6/2023 | Roy |
| 2023/0354082 | A1 | 11/2023 | Ohashi |

FOREIGN PATENT DOCUMENTS

| | | | |
|---|---|---|---|
| JP | 2007052781 | A | 3/2007 |
| JP | 2013156112 | A | 8/2013 |
| JP | 2017090092 | A | 5/2017 |
| JP | 2023092977 | A | 7/2023 |

OTHER PUBLICATIONS

Kosuke Ohashi, U.S. Appl. No. 18/171,758, Ex Parte Quayle Action dated Oct. 30, 2023.

Kosuke Ohashi, U.S. Appl. No. 18/171,758, Notice of Allowance dated Jan. 25, 2024.

* cited by examiner

COMMUNICATION SYSTEM, VEHICLE, SERVER, METHOD FOR CONTROLLING VEHICLE, AND NON-TRANSITORY STORAGE MEDIUM

CROSS-REFERENCE TO RELATED APPLICATION

This application is a continuation of U.S. patent application Ser. No. 18/171,758, filed Feb. 21, 2023, which claims priority to Japanese Patent Application No. 2022-074153 filed on Apr. 28, 2022, incorporated herein by reference in its entirety.

BACKGROUND

1. Technical Field

The present disclosure relates to communication systems that receive data while a vehicle is traveling, vehicles, servers, methods for controlling a vehicle, and non-transitory storage media.

2. Description of Related Art

Vehicles are equipped with a control device that controls the operation of various in-vehicle electric devices. A control program for this control device can be updated not only by using data transmitted by wire, but also by using a so-called over-the-air (OTA) technique. When the OTA technique is used, the control program is updated using update information received from an external server by wireless communication. A control program using such an OTA technique is required to be downloaded from a server without failure or interruption while the vehicle is traveling.

In, for example, Japanese Unexamined Patent Application Publication No. 2017-090092 (JP 2017-090092 A), a travel route of a vehicle is divided into unsuitable sections that are not suitable for download and suitable sections that are suitable for download. Repeated download failures or interruptions are prevented by, for example, completing a download in a suitable section.

SUMMARY

However, a download of data to be downloaded may not be able to be completed in a suitable section, depending on a change in reception level, the speed of the vehicle, etc. in the suitable section. If the download is interrupted due to lost communication in an unsuitable section, the download may need to be started over. As a result, the amount of communication may increase unnecessarily.

The present disclosure provides a communication system, a vehicle, a server, a method for controlling a vehicle, and a non-transitory storage medium that reduces an unnecessary increase in amount of communication when receiving data while a vehicle is traveling.

A communication system according to a first aspect of the present disclosure includes: a communication device configured to communicate with a server external to a vehicle; and a control device. The control device is configured to control the communication device to receive predetermined data from the server while the vehicle is traveling along a travel route to a destination. The control device is configured to acquire a first section and a second section, among the travel route. The first section is a section where the data is received. The second section is a section where the data is not received. The control device is configured to control the communication device to receive the data while the vehicle is traveling in the first section. The control device is configured to control the communication device in such a way that an interruption process is completed before the vehicle travels in the second section. The interruption process is a process of interrupting reception of the data in a resumable state.

With this configuration, the communication device is controlled so that the data is received while the vehicle is being driven in the first section and so that the interruption process is completed before the vehicle travels in the second section. Therefore, the reception of the data can be resumed, without being started over, after, for example, the vehicle passes through the second section. As a result, an unnecessary increase in amount of communication can be reduced as compared to the case where the reception of the data is started over every time the reception of the data resumes.

In the communication system according to the first aspect of the present disclosure, the control device may be configured to control the communication device in such a manner that the reception of the data resumes after the vehicle passes through the second section.

With this configuration, the reception of the data can be resumed, without being started over, after the vehicle passes through the second section. As a result, an unnecessary increase in amount of communication can be reduced as compared to the case where the reception of the data is started over every time the reception of the data resumes.

In the communication system according to the first aspect of the present disclosure, the control device may be configured to set the second section using area information including an area where communication by the communication device is possible and an area that is out of a communication range.

With this configuration, the second section can be identified using the area information. Therefore, the interruption process can be completed before the vehicle travels in the second section.

In the communication system according to the first aspect of the present disclosure, the control device may be configured to perform the interruption process when a signal reception level of the communication device falls below a threshold while the vehicle is traveling in the first section.

With this configuration, the interruption process can be completed before the vehicle travels in the second section.

A vehicle according to a second aspect of the present disclosure includes a communication system. The communication system includes: a communication device configured to communicate with an external server; and a control device. The control device is configured to control the communication device to receive predetermined data from the server while the vehicle is traveling along a travel route to a destination. The control device is configured to acquire a first section and a second section, among the travel route. The first section is a section where the data is received. The second section is a section where the data is not received. The control device is configured to control the communication device to receive the data while the vehicle is traveling in the first section. The control device is configured to control the communication device in such a way that an interruption process is completed before the vehicle travels in the second section. The interruption process is a process of interrupting reception of the data in a resumable state.

A server according to a third aspect of the present disclosure includes: a communication device configured to communicate with a vehicle; and a control device. The control device is configured to control the communication device to transmit predetermined data while the vehicle is traveling along a travel route to a destination. The control device is configured to transmit the data while the vehicle is traveling in a first section. The first section is a section in which the vehicle receives the data. The control device is configured to interrupt transmission of the data when information indicating that the vehicle completed an interruption process is received before the vehicle travels in a second section. The interruption process is a process of interrupting reception of the data in a resumable state. The second section is a section in which the vehicle does not receive the data. The first section and the second section are included in the travel route A method for controlling a vehicle configured to communicate with an external server according to a fourth aspect of the present disclosure includes: receiving predetermined data from the server while the vehicle is traveling along a travel route to a destination; acquiring a first section and a second section of the travel route; receiving the data while the vehicle is traveling in the first section; and completing an interruption process before the vehicle travels in the second section. The first section is a section where the data is received. The second section is a section where the data is not received. The interruption process is a process of interrupting reception of the data in a resumable state.

A non-transitory storage medium according to a fifth aspect of the present disclosure stores instructions that are executable by one or more processors and that cause the one or more processors to perform functions. The functions include: receiving predetermined data from an external server while a vehicle configured to communicate with the server is traveling along a travel route to a destination; acquiring a first section and a second section, among the travel route; receiving the data while the vehicle is traveling in the first section; and completing an interruption process before the vehicle travels in the second section. The first section is a section where the data is received. The second section is a section where the data is not received. The interruption process is a process of interrupting reception of the data in a resumable state.

The present disclosure can thus provide a communication system, a vehicle, a server, a method for controlling a vehicle, and a non-transitory storage medium, that reduces an unnecessary increase in amount of communication when the data is received while a vehicle is traveling.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. The same or corresponding parts are denoted by the same signs throughout the drawings, and description thereof will not be repeated.

Figure 1:
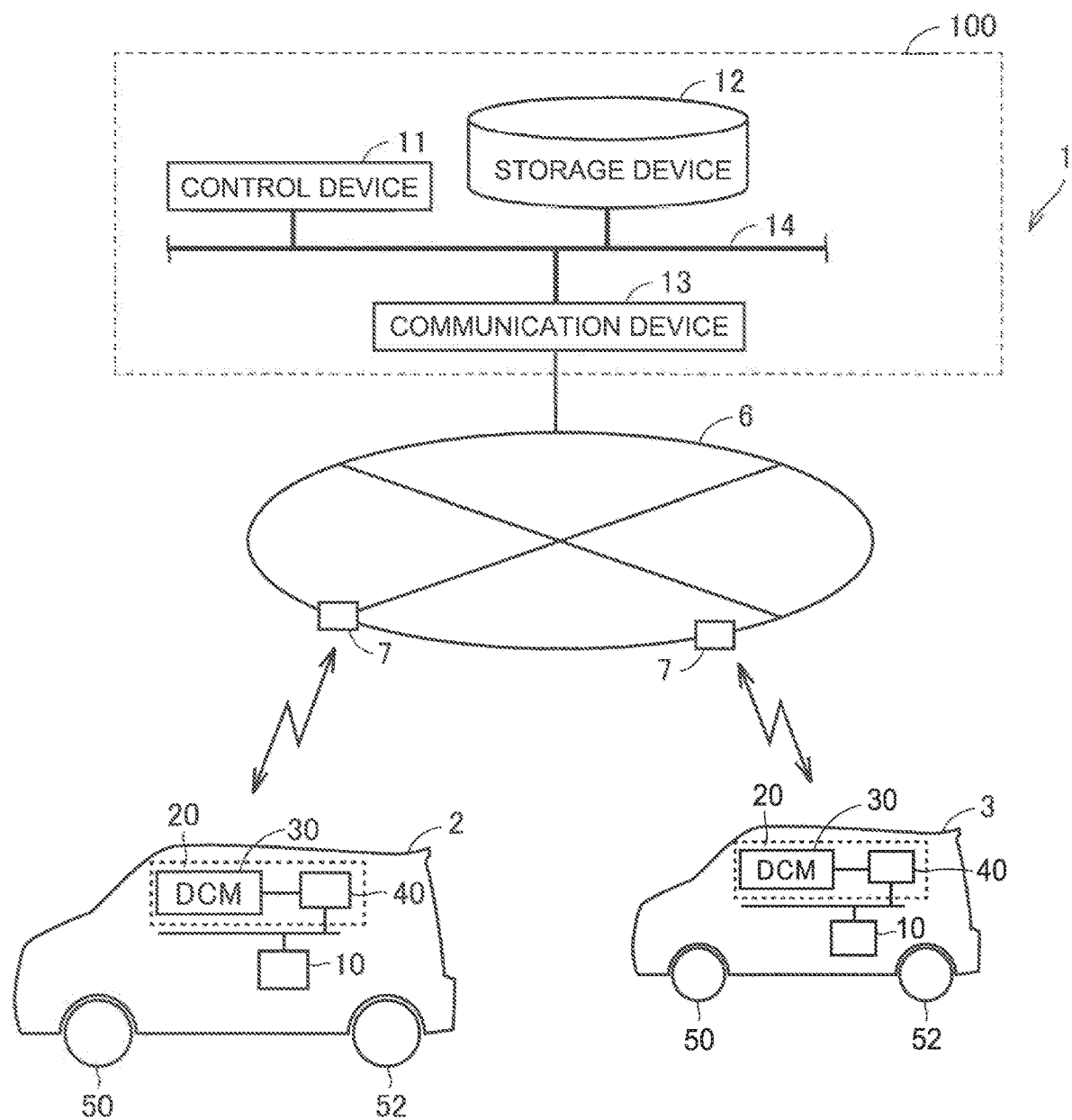
FIG. 1 illustrates an example of the configuration of a vehicle information management system.

FIG. 1 illustrates an example of the configuration of a vehicle information management system 1. As shown in FIG. 1, in the present embodiment, the vehicle information management system 1 includes a plurality of vehicles 2, 3, a communication network 6, a base station 7, and a data center 100.

The vehicles 2, 3 may be any vehicles as long as they can communicate with the data center 100. For example, the vehicles 2, 3 may be vehicles using an engine as a driving source, battery electric vehicles using an electric motor as a driving source, or hybrid electric vehicles equipped with an engine and an electric motor and using either or both of the engine and the electric motor as a driving source. For convenience of description, only two vehicles 2, 3 are shown in FIG. 1. However, the number of vehicles is not particularly limited to two, and may be three or more.

The vehicle information management system 1 acquires or provides predetermined information from or to the vehicles 2, 3 configured to communicate with the data center 100. The vehicle information management system 1 is configured to manage acquired information and information to be provided.

The data center 100 includes a control device 11, a storage device 12, a communication device 13, and a communication bus 14. The control device 11, the storage device 12, and the communication device 13 are connected to each other via the communication bus 14 so that these devices 11, 12, and 13 can communicate with each other. The data center 100 is an example of the "server" in the present embodiment.

Although not shown in the figure, the control device 11 includes a central processing unit (CPU), a memory (such as a read-only memory (ROM) and a random access memory (RAM)), and an input and output port for inputting and outputting various signals. Various controls that are performed by the control device 11 are performed by software processing, that is, by the CPU reading a program stored in the memory. The various controls that are performed by the control device 11 can also be implemented by a general-purpose computer (not shown) executing a program stored in a non-transitory storage medium. The various controls that are performed by the control device 11 need not necessarily be performed by the software processing, and may be performed by processing with dedicated hardware (electronic circuit).

The storage device 12 stores predetermined information on the vehicles 2, 3 configured to communicate with the data center 100. The predetermined information includes, for example, information on control programs for each vehicle 2, 3 that will be described later, and information identifying each vehicle 2, 3 (hereinafter referred to as vehicle identification (ID)). The vehicle ID is unique information set for each vehicle. The data center 100 can identify a vehicle that sends information, or a vehicle that receives information by the vehicle ID.

The communication device 13 implements bidirectional communication between the control device 11 and the communication network 6. The data center 100 can communicate with a plurality of vehicles including the vehicles 2, 3 via the base stations 7 on the communication network 6 by using the communication device 13.

Next, a specific configuration of the vehicles 2, 3 will be described. Since the vehicles 2, 3 basically have the same configuration, the configuration of the vehicle 2 will be representatively described below.

The vehicle 2 includes drive wheels 50 and driven wheels 52. The drive wheels 50 are rotated by the operation of the driving source. As a result, the driving force acts on the vehicle 2, and the vehicle 2 is driven.

The vehicle 2 further includes a navigation system 10, a Data Communication Module (DCM) 30, and an electronic control unit (ECU) 40. A communication system 20 according to the present embodiment is formed by the DCM 30 and the ECU 40.

The navigation system 10 includes: a position detection device using, for example, Global Positioning System (GPS) satellites and a wireless local area network (LAN); a database storing map information; and a control device using a CPU etc. (none of which are shown). The position detection device identifies the position of the vehicle 2. The navigation system 10 determines a travel route on a map from the current position of the vehicle 2 to the destination, and provides guidance to guide the vehicle 2 traveling along the travel route to the destination. The navigation system 10 displays the map information and guidance information on a touch panel display, not shown, identifies a destination entered by a user through the user's operation of a touch panel, and displays a plurality of travel route options to the identified destination.

The ECU 40 is a computer including: a processor, such as a CPU, that executes a program; a memory; and an input and output interface. The ECU 40 includes various control programs for controlling various actuators mounted on the vehicle 2. The various control programs include, for example, control programs for at least one of the following: steering control, drive control, and braking control. The various control programs may include, for example, a program for implementing a driving support system having functions related to driving support of the vehicle 2. The driving support system includes, for example, an autonomous driving system (AD), an automated parking system, and an advanced driver assist system (ADAS).

The DCM 30 is a communication module configured to bidirectionally communicate with the data center 100. The DCM 30 is an example of the "communication device" in the present embodiment.

The ECU 40 may use a so-called over-the-air (OTA) technique to update any of the various control programs stored in the memory. When the OTA technique is used, a control program is updated using update information received from the data center 100 external to the vehicle 2 by wireless communication. With the OTA technique, update programs can be provided to the vehicle 2 to, for example, modify or add functions even after the vehicle 2 is put on the market. In order to update a control program using the OTA technique, the vehicle 2 is required to, for example, download an update program from the data center 100 via the DCM 30 etc. without failure or interruption while traveling.

One possible way to do so is to divide a travel route of the vehicle 2 into unsuitable sections not suitable for download (that is, sections where the vehicle 2 does not receive data) and suitable sections suitable for download, and cause the vehicle 2 to download data in a suitable section.

Figure 2:
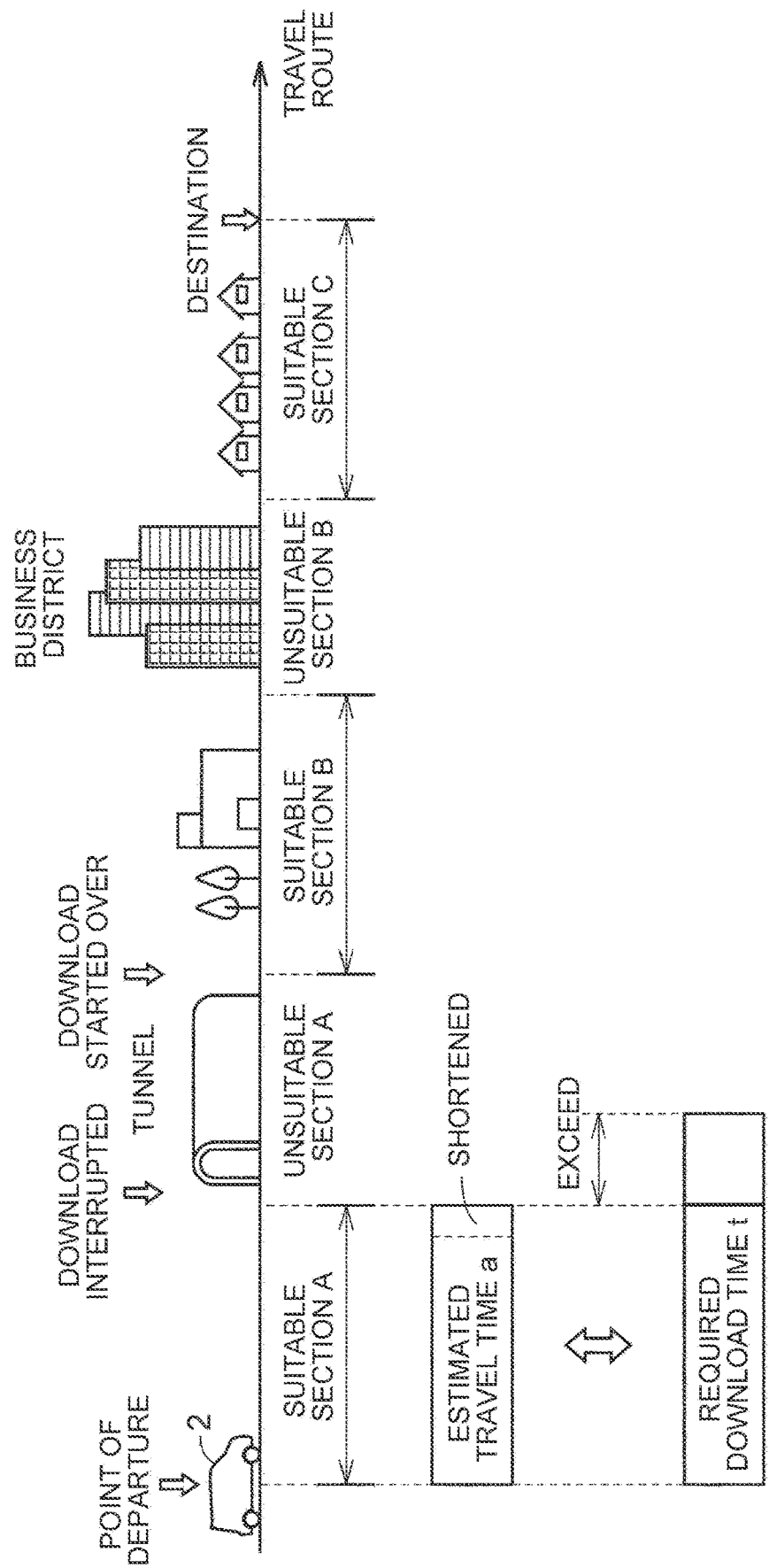
FIG. 2 illustrates suitable sections and unsuitable sections.

FIG. 2 illustrates suitable sections and unsuitable sections. When there is a tunnel on a travel route, the signal reception level of the vehicle 2 may decrease while traveling in the tunnel. Similarly, the signal reception level is unstable in an areas with high-rise buildings such as high-rise areas. Therefore, the actual download time may deviate significantly from the estimated time due to, for example, an increased range of fluctuation in communication speed. Therefore, the inside of tunnels and the high-rise areas are set as unsuitable sections that are not suitable for download. The unsuitable sections are not limited to the inside of tunnels and the high-rise areas. Other unsuitable sections include, for example, a gap between areas where communication is available in the suburbs, and a border between two countries. A border between two countries is an unsuitable section because in the case where a travel route crossing a border between two countries in Europe etc. is selected, a process of switching communication providers (e.g., a roaming process) is performed when the vehicle 2 crosses the border.

Therefore, as shown in FIG. 2, when the vehicle 2 starts to travel along a travel route from a point of departure to a destination, the travel route can be divided into suitable sections A, B, and C suitable for download and unsuitable sections A, B not suitable for download. For example, when the estimated travel time "a" in the suitable section A is longer than the required download time "t", it is conceivable to download an update program in the suitable section A.

However, if the actual travel time is shortened, and is less than the estimated travel time "a"; or if the actual download time exceeds, and is longer than the required download time "t" due to fluctuations in communication speed, the download may not be able to be completed in the suitable section. If the download is continued even when the vehicle 2 travels in the unsuitable section A, communication may be lost during the download, and the download may be interrupted. As a result, even if the download is resumed after the vehicle 2 passes through the unsuitable section A, the progress of the download is reset etc., so that the download will be started over. The amount of communication may therefore increase unnecessarily. In particular, the greater the amount of data of the update program, the greater the amount of communication that will be wasted the download being started over.

Therefore, in the present embodiment, the ECU 40 acquires a first section (suitable section) where the vehicle 2 can receive data and a second section (unsuitable section) where the vehicle 2 does not receive data, controls the DCM 30 so that the vehicle 2 receives data while the vehicle 2 travels in the first section, and controls the DCM 30 so that an interruption process of interrupting reception of the data in a resumable manner is completed before the vehicle 2 travels in the second section. The ECU 40 also controls the DCM 30 so that the reception of the data resumes after the vehicle 2 passes through the second section.

The DCM 30 is thus controlled so that data is received while the vehicle 2 is traveling in the first section and so that the interruption process is completed before the vehicle 2 travels in the second section. Therefore, the reception of the data can be resumed, without being started over, after, for example, the vehicle 2 passes through the second section. As a result, an unnecessary increase in amount of communication can be reduced as compared to the case where reception of the data is started over every time the reception of the data resumes.

Figure 3:
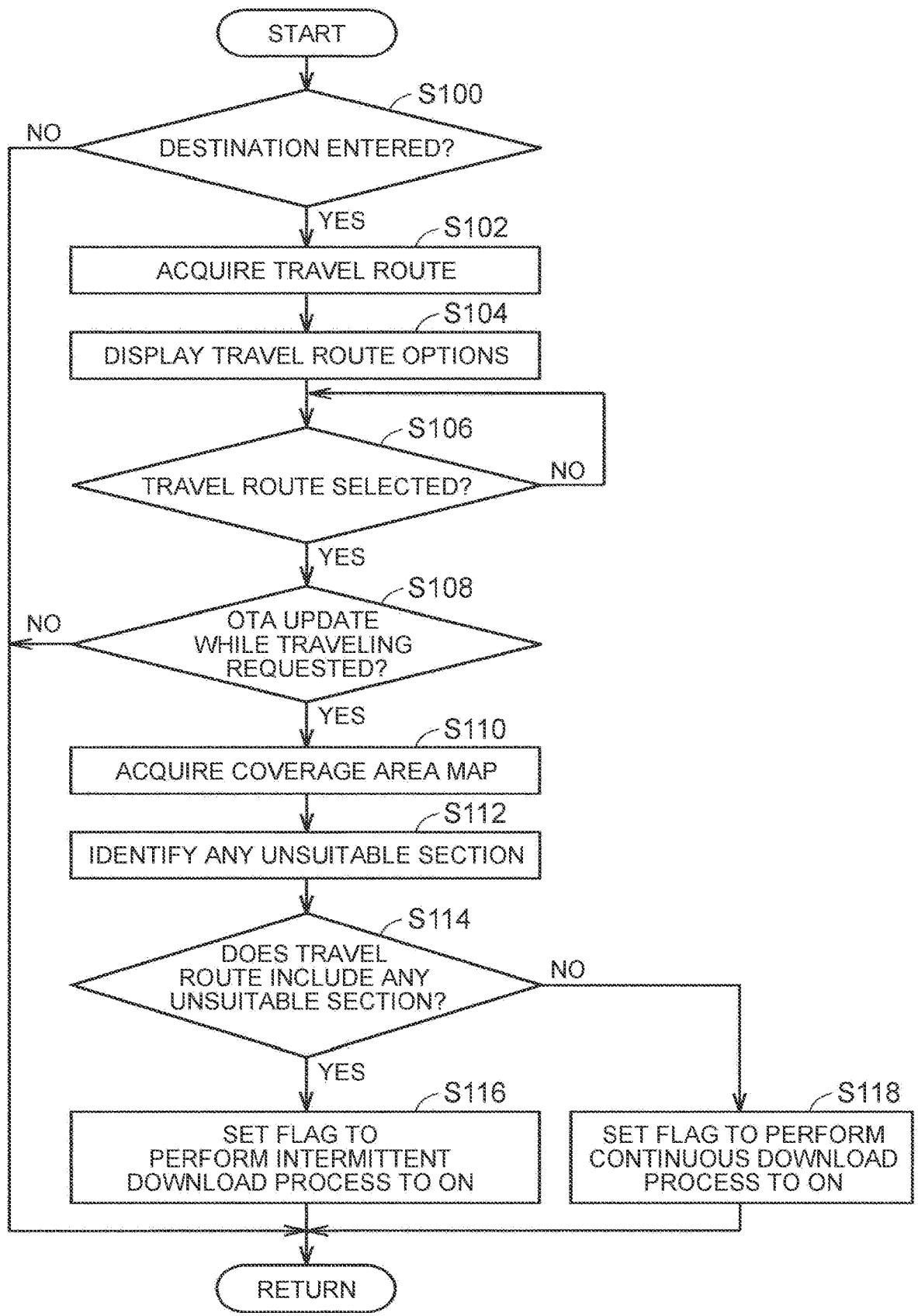
FIG. 3 is a flowchart showing an example of a process that is performed by an electronic control unit (ECU)

An example of a process that is performed by the ECU 40 will be described below with reference to FIG. 3. FIG. 3 is a flowchart showing an example of a process that is performed by the ECU 40. The process shown in this flowchart is repeatedly performed by the ECU 40 at predetermined control cycles.

In step S100, the ECU 40 determines whether a destination has been entered. For example, the ECU 40 receives from the navigation system 10 information indicating whether a destination has been entered by the user's operation of the touch panel etc. The ECU 40 uses the received information to determine whether a destination has been entered. For example, the information indicating whether a destination has been entered may include at least one of the following: information indicating that an operation of setting the cursor position on a map displayed on the screen as a destination has been received, information indicating that the address of a destination has been entered, information indicating that information on a destination has been received from a mobile terminal (not shown), and information indicating that the user's speech has been recognized by speech recognition and that a destination has been specified by the speech. When it is determined that a destination has been entered (YES in step S100), the process proceeds to step S102.

In step S102, the ECU 40 acquires a travel route. For example, the ECU 40 acquires a plurality of travel routes to the destination as travel route options by using the navigation system 10. For example, the ECU 40 acquires the following travel routes as travel route options: a shortest travel route to the destination, a route avoiding traffic congestions, a travel route assuming the use of toll roads, and a travel route including only local roads.

In step S104, the ECU 40 displays the travel routes as travel route options on the touch panel display, not shown. For example, the ECU 40 may display one of the travel routes and display the others in a selectable manner, or may display two or more of the travel routes.

Figure 4:
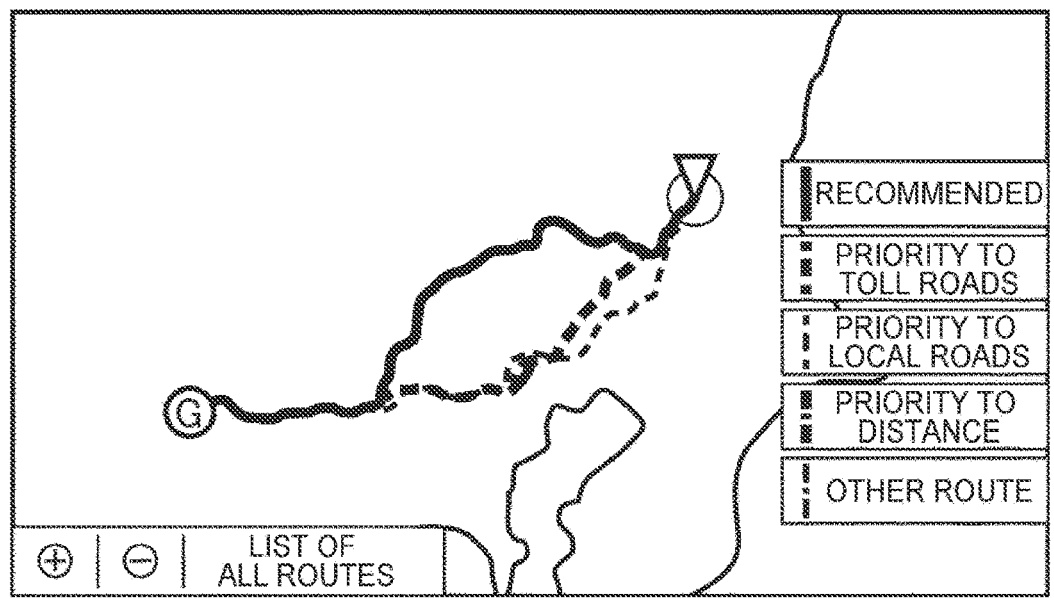
FIG. 4 shows a display example of a plurality of travel routes.

FIG. 4 shows a display example of a plurality of travel routes. In FIG. 4, a plurality of travel routes is displayed using different types of lines. The displayed travel routes in FIG. 4 include, for example, a recommended route, a travel route with priority given to toll roads, and a travel route with priority given to local roads.

In step S106, the ECU 40 determines whether a travel route has been selected. For example, the ECU 40 determines that a travel route has been selected when the user has performed an operation of selecting a travel route on the touch panel etc. When it is determined that a travel route has been selected (YES in step S106), the process proceeds to step S108.

In step S108, the ECU 40 determines whether an OTA update while the vehicle 2 travels is requested. An OTA update refers to an update process using an update program downloaded from the data center 100. The ECU 40 may determine that an OTA update while the vehicle 2 travels is requested when, for example, a download of an urgent update program is requested from the data center 100. Alternatively, the ECU 40 may determine that an OTA update while the vehicle 2 travels is requested when an OTA update is requested and the travel time to the destination is equal to or longer than a predetermined time. Alternatively, the ECU 40 may determine that an OTA update while the vehicle 2 travels is requested when there is an update program whose amount of data is downloadable within the travel time to the destination. When it is determined that an OTA update while the vehicle 2 travels is requested (YES in step S108), the process proceeds to step S110.

In step S110, the ECU 40 acquires a coverage area map. The coverage area map shows areas where a communication line is available to the vehicle 2. For example, in the coverage area map, a plurality of types of areas classified according to the communication speed is shown superimposed on the map information. That is, the coverage area map indicates whether the communication line is available at a specific position on the map, and is configured so that information on the upper limit of the communication speed can be acquired.

Figure 5:
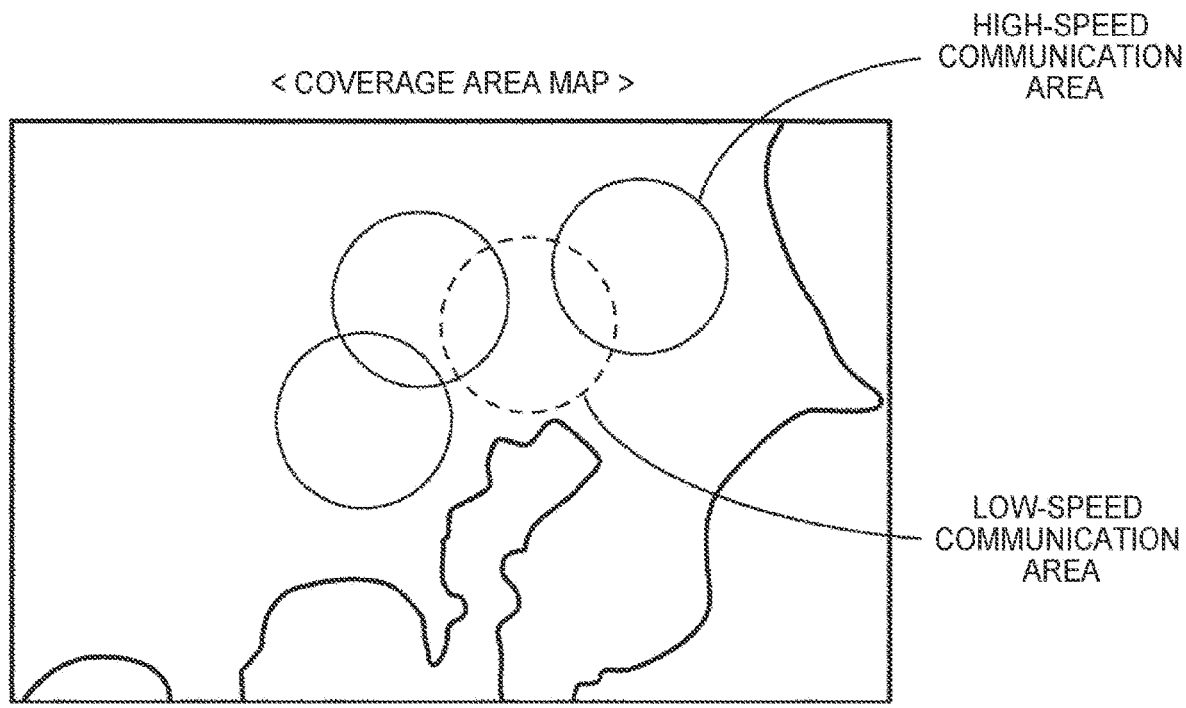
FIG. 5 shows an example of a coverage area map.

FIG. 5 shows an example of the coverage area map. Circular areas shown by solid lines in FIG. 5 indicate areas where high-speed communication is available (hereinafter referred to as "high-speed communication areas"). A circular area shown by a dashed line in FIG. 5 indicates an area where low-speed communication is available (hereinafter referred to as "low-speed communication area"). For convenience of description, the areas where communication is available are shown by circles in FIG. 5. However, the shape of the areas where communication is available is not limited to a circle. The areas where communication is available may be set by actually measuring the signal strength etc., or may be set in advance in consideration of geographical features, shielding objects such as buildings, etc. For convenience of description, FIG. 5 shows three high-speed communication areas and one low-speed communication area as an example. However, the numbers of high-speed communication areas and low-speed communication areas are not limited to these.

For example, the coverage area map may be stored in advance in the memory of the ECU 40, or may be downloaded from the data center 100 via the DCM 30. Alternatively, the coverage area map may be stored in advance in the memory of the ECU 40, and the coverage area map stored in the memory may be updated using update information downloaded from the data center 100 via the DCM 30.

In step S112, the ECU 40 identifies any unsuitable section on the selected travel route. For example, the ECU 40 identifies any unsuitable section by superimposing the selected travel route on the coverage area map, setting the travel route in the areas where communication is available as suitable sections, and setting the travel route in the areas where communication is not available as unsuitable sections.

In step S114, the ECU 40 determines whether the travel route includes any unsuitable section. For example, when any section of the travel route is set as an unsuitable section, the ECU 40 determines that the travel route includes an unsuitable section. When it is determined that the travel route includes an unsuitable section (YES in step S114), the process proceeds to step S116.

In step S116, ECU 40 sets a flag to perform an intermittent download process to "on". The intermittent download process is a process of intermittently continuing a download of the update program used for the OTA update and completing the download. The intermittent download process will be described in detail later. When it is determined that the travel route does not include any unsuitable section (NO in step S114), the process proceeds to step S118.

In step S118, the ECU 40 sets a flag to perform a continuous download process to on. The continuous download process is a process of continuously downloading the update program used for the OTA update without interruption and completing the download.

When it is determined that destination has not been entered (NO in step S100) or when it is determined that an OTA update while the vehicle 2 travels is not requested (NO in step S108), the process ends. When it is determined that travel route has not been selected (NO in step S106), the process returns to step S106.

Figure 6:
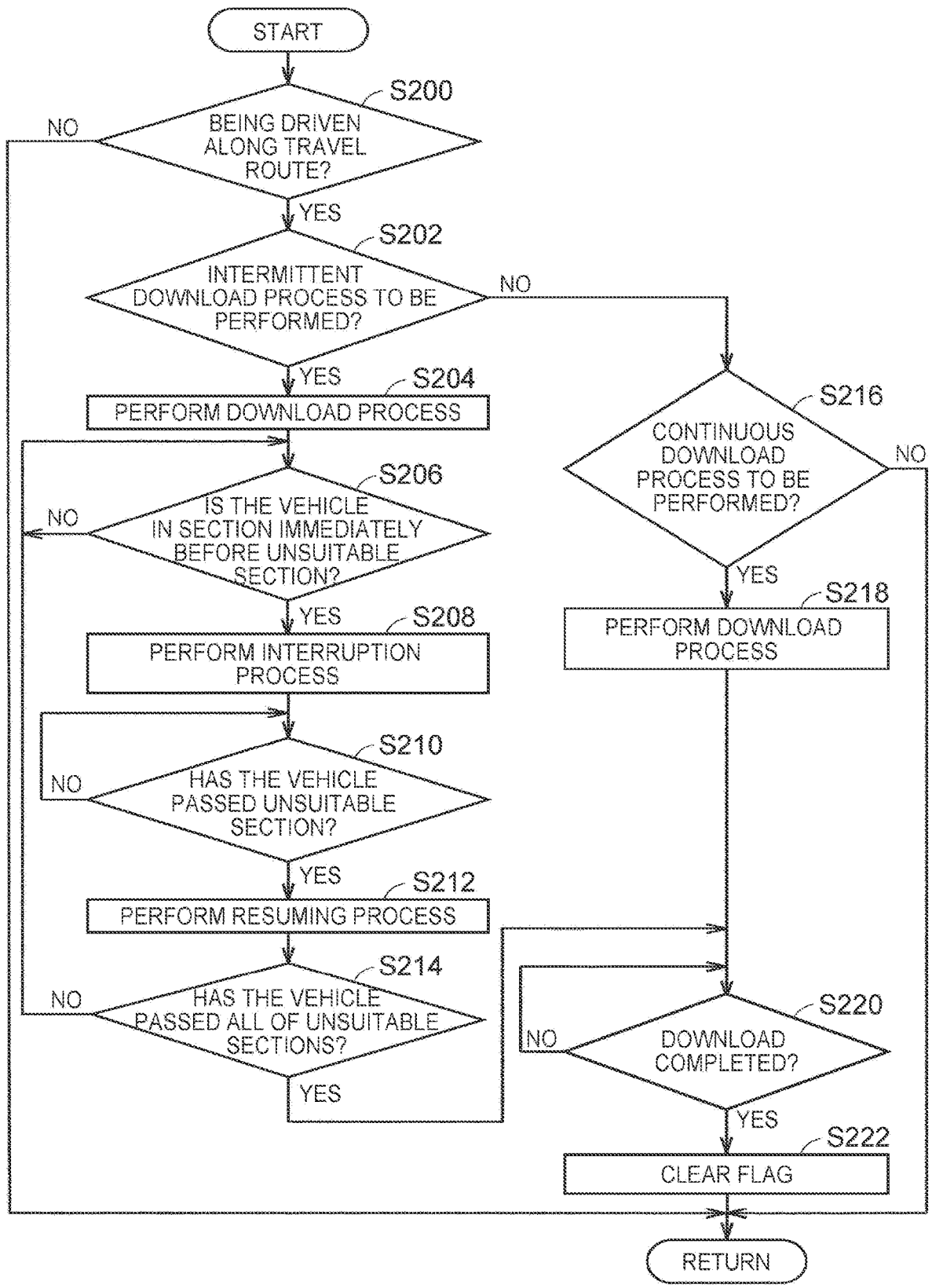
FIG. 6 is a flowchart showing an example of a download process that is performed by the ECU.

Next, an example of a download process that is performed by the ECU 40 while the vehicle 2 is being driven along a travel route will be described. FIG. 6 is a flowchart showing an example of a download process that is performed by the ECU 40. The process shown in this flowchart is also repeatedly performed by the ECU 40 at predetermined control cycles.

In step S200, the ECU 40 determines whether the vehicle 2 is being driven along a travel route. For example, when a travel route has been selected, the vehicle 2 is in operation (in a movable state), and the current position of the vehicle 2 is on the travel route, the ECU 40 determines that the vehicle 2 is being driven along a travel route. When it is determined that the vehicle 2 is being driven along a travel route (YES in step S200), the process proceeds to step S202.

In step S202, the ECU 40 determines whether to perform the intermittent download process. For example, the ECU 40 determines that the intermittent download process is to be performed when the flag to perform the intermittent download process is on. When it is determined that the intermittent download process is to be performed (YES in step S202), the process proceeds to step S204.

In step S204, the ECU 40 performs a process of receiving an update program to be downloaded from the data center 100 and storing the update program in the memory (download process). The ECU 40 determines, depending on the communication speed in each suitable section other than the unsuitable sections, an object to be downloaded whose amount of data is small enough that a download of the object can be completed when or before the vehicle 2 reaches the destination, and performs a download process of the determined object. The process then proceeds to step S206.

In step S206, the ECU 40 determines whether the current position of the vehicle 2 is in the section immediately before an unsuitable section. The section immediately before an unsuitable section is, for example, a section starting from a point that is a predetermined distance before the start point of an unsuitable section and ending at the start point of the unsuitable section. The predetermined distance is not particularly limited as long as it is, for example, great enough to secure the time required from the start to completion of the download interruption process that will be described later. The ECU 40 may identify the section immediately before an unsuitable section when identifying an unsuitable section. Alternatively, the ECU 40 determines that the current position of the vehicle 2 is in the section immediately before an unsuitable section when the signal strength falls below a threshold after the vehicle 2 passes through a point that is the predetermined distance before the start point of an unsuitable section. When it is determined that the current position of the vehicle 2 is in the section immediately before an unsuitable section (YES in step S206), the process proceeds to step S208.

In step S208, the ECU 40 performs the interruption process. The interruption process includes a process of interrupting the download of the update program in a resumable state. For example, in the interruption process, the ECU 40 makes the download of the update program resumable by generating, or acquiring from the data center 100, information that allows the download to be resumed from the progress status of the download immediately before the interruption, and stops receiving the update program. Specifically, the interruption process can be performed by a known method. Therefore, the interruption process will not be described in detail. The process then proceeds to step S210.

In step S210, the ECU 40 determines whether the vehicle 2 has passed the unsuitable section. For example, the ECU 40 determines that the vehicle 2 has passed through the unsuitable section when the current position of the vehicle 2 is a position after the unsuitable section. For example, the ECU 40 may determine that the vehicle 2 has passed through the unsuitable section when the signal strength becomes higher than the threshold. When it is determined that the vehicle 2 has passed through the unsuitable section (YES in step S210), the process proceeds to step S212.

In step S212, the ECU 40 performs a resuming process. The resuming process includes a process of resuming the download of the update program from the progress status at the time the download was interrupted. For example, in the resuming process, the ECU 40 receives, from the data center 100, data that continues from the progress status of the download immediately before the interruption, and stores the data in the memory. The process then proceeds to step S214.

In step S214, the ECU 40 determines whether the vehicle 2 has passed through all of the unsuitable sections. For example, the ECU 40 determines that the vehicle has passed through all the unsuitable sections when there is no unsuitable section between the current position of the vehicle 2 and the destination. When it is determined that the vehicle 2 has passed through all the unsuitable sections (YES in step S214), the process proceeds to step S220. When it is determined that the vehicle 2 has not passed through all of the unsuitable sections (NO in step S214), the process returns to step S206.

When it is determined that the intermittent download process is not to be performed (NO in step S202), the process proceeds to step S216.

In step S216, the ECU 40 determines whether to perform the continuous download process. The ECU 40 determines that the continuous download process is to be performed when the flag to perform the continuous download process is on. When it is determined that the continuous download process is to be performed (YES in step S216), the process proceeds to step S218.

In step S218, the ECU 40 performs the download process. Since the download process is as described above, detailed description thereof will not be repeated. The process then proceeds to step S220.

In step S220, the ECU 40 determines whether the download is completed. For example, the ECU 40 may determine that the download is completed when the progress of the download of the update program to be downloaded reaches 100% or when the downloaded amount of data matches the amount of data of the update program received from the data center 100. When it is determined that the download is completed (YES in step S220), the process proceeds to step S222.

In step S222, the ECU 40 sets the flag to off. For example, when the flag to perform the continuous download process is on, the ECU 40 sets this flag to off. Alternatively, for example, when the flag to perform the intermittent download process is on, the ECU 40 sets the flag to perform the intermittent download process to off. The process then ends.

When it is determined that the current position of the vehicle 2 is not in the section immediately before an unsuitable section (NO in step S206), the process returns to step S206. When it is determined that the vehicle 2 has not passed through the unsuitable section (NO in step S210), the process returns to step S210.

The operation of the ECU 40 based on such the structure and flowchart described above will be described. For example, when a destination of the vehicle 2 is entered by the user's operation of the touch panel before driving of the vehicle 2 is started (YES in step S100), a travel route is acquired from the navigation system 10 (step S102), and a plurality of travel routes is displayed as travel route options on a user interface such as a display (step S104). When one of the travel routes is selected by the user's selection operation (YES in step S106), it is determined whether there an OTA update while the vehicle 2 travels is requested (step S108). When an OTA update while the vehicle 2 travels is requested (step S108) such as when there is a request, from the data center 100, to download an update program whose amount of data is downloadable while the vehicle is driven to the destination, a coverage area map is acquired (step S110), and any unsuitable section is identified using the acquired coverage area map (step S112). When it is determined that the travel route includes an unsuitable section (YES at step S114), the flag to perform the intermittent download process is set to on (step S116).

When the vehicle 2 starts being driven along the selected travel route (YES in step S200), the download process is performed because the flag to perform the intermittent download process is on (YES in step S202).

Figure 7:
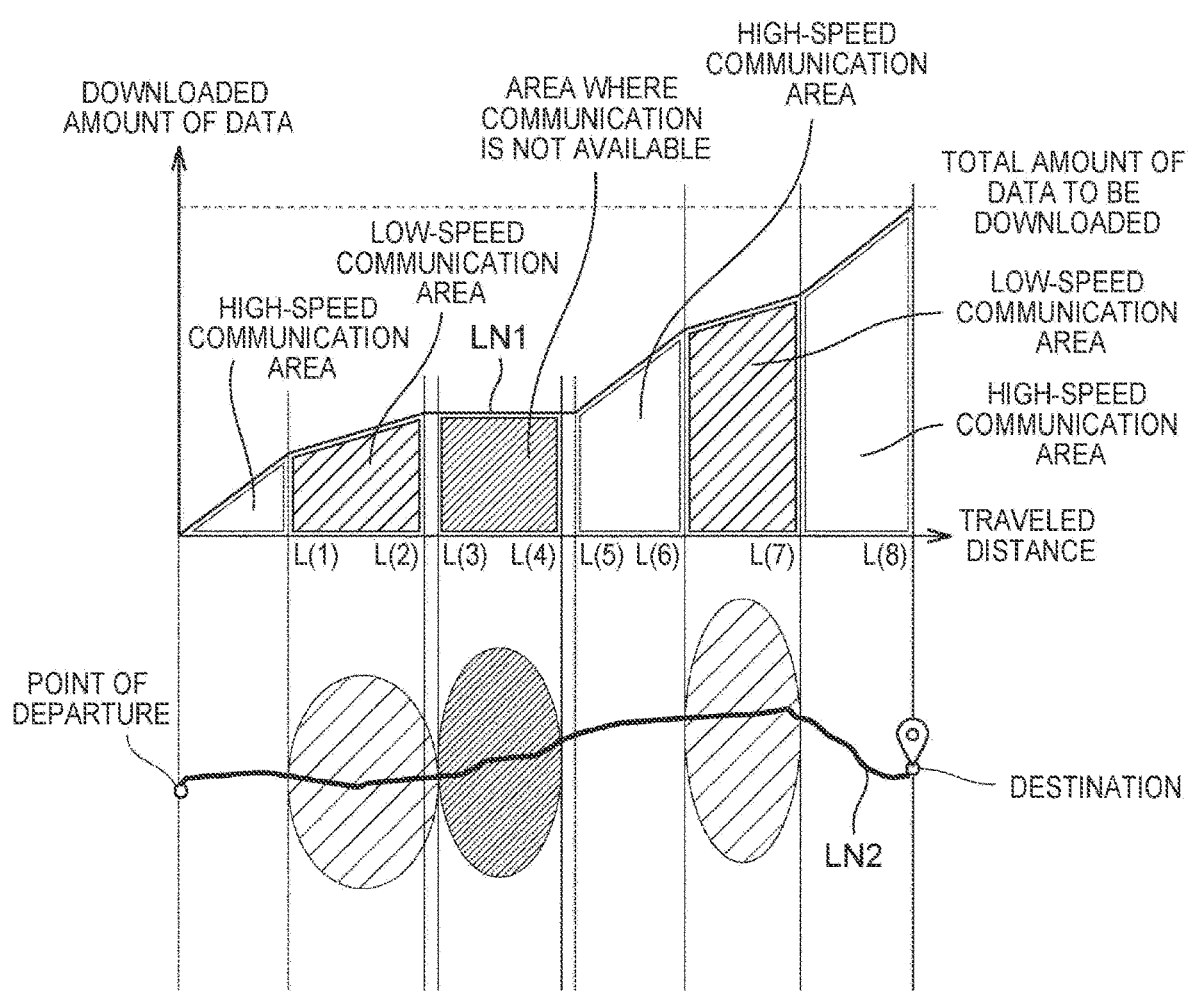
FIG. 7 is a graph illustrating changes in downloaded amount of data on a travel route from a point of departure to a destination.

FIG. 7 is a graph illustrating changes in downloaded amount of data on a travel route from a point of departure to a destination. LN1 in FIG. 7 indicates changes in downloaded amount of data. LN2 in FIG. 7 indicates a travel route from a point of departure to a destination.

As shown in FIG. 7, since the section from the point of departure to the traveled distance L(1) is located in a high-speed communication area, the download is performed in a higher-speed communication environment than in other communication areas (low-speed communication areas). Since the section from the traveled distance L(1) to the traveled distance L(2) is located in a low-speed communication area, the download is performed in a lower-speed communication environment than in high-speed communication areas. Since it is determined that the section from the traveled distance L(2) to the traveled distance L(3) is the section immediately before an unsuitable section (YES in step S206), the interruption process is performed (step S208). Since the interruption process is completed before the traveled distance reaches L(3), the download is interrupted in a resumable state. When the vehicle 2 is in the section from the traveled distance L(3) to the traveled distance L(4), it means that the vehicle 2 is passing through the unsuitable section (NO in step S210). Therefore, the download continues in an interrupted state. When the vehicle 2 is in the section from the traveled distance L(4) to the traveled distance L(5) and therefore it is determined that the vehicle 2 has passed through the unsuitable section (YES in step S210), the download resuming process is performed (step S212). At this time, the download of the update program is not started over but is resumed from the progress status at the time the download was interrupted by the interruption process. Since the vehicle 2 has passed through all the unsuitable sections (YES in step S214), the download is continued thereafter.

When the vehicle 2 is in the section from the traveled distance L(5) to the traveled distance L(6), the vehicle 2 is in a high-speed communication area. Therefore, the download is continued in a high-speed communication environment. When the vehicle 2 is in the section from the traveled distance L(6) to the traveled distance L(7), the vehicle 2 is in a low-speed communication area. Therefore, the download is continued in a low-speed communication environment. When the vehicle 2 is in the section from the traveled distance L(7) to the traveled distance L(8), the vehicle 2 is traveling again in a high-speed communication area. Therefore, the download is continued in a high-speed communication environment. When the download of the update program to be downloaded is completed at the time the vehicle 2 reaches the destination (YES in step S220), the flag to perform the intermittent download process is set to off (step S222). Although FIG. 7 shows an example in which the download of the update program is completed when the vehicle 2 reaches the destination, the download of the update program may be completed before the vehicle 2 reaches the destination.

When it is determined that the selected travel route does not include any unsuitable section (NO in step S114), the flag to perform the continuous download process is set to on.

Therefore, when the vehicle 2 starts being driven along the selected travel route (YES in step S200), it is determined that the flag to perform the intermittent download process is off (NO in step S202) and that the flag to perform the continuous download process is on (YES in step S216). Therefore, the download process is performed (step S218). At this time, an update program whose amount of data is downloadable within the travel time to reach the destination is selected, and a download of the update program is performed. When it is determined that the download of the update program is completed when or before the vehicle 2 reaches the destination (YES in step S220), the flag to perform the continuous download process is set to off (step S222).

As described above, with the vehicle information management system of the present embodiment, the DCM 30 is controlled so that data is received when the vehicle is being driven in the first section (suitable section) and so that the interruption process is completed before the vehicle travels in the second section (unsuitable section). Therefore, the reception of the data can be resumed, without being started over, after the vehicle passes through the second section. As a result, an unnecessary increase in amount of communication can be reduced as compared to the case where the reception of the data is started over every time the download resumes. Moreover, since the second section can be identified using area information such as the coverage area map, the interruption process can be completed before the vehicle travels in the second section. A communication system that reduces an unnecessary increase in amount of communication when receiving data while a vehicle is traveling, a vehicle, a server, a method for controlling a vehicle, and a non-transitory storage medium can thus be provided.

Modifications will be described below. In the above embodiment, the flag to perform the intermittent download process is set to on, when the travel route includes an unsuitable section. However, when the travel route includes an unsuitable section but the travel time to the unsuitable section or the travel time from when the vehicle passes through the unsuitable section until the vehicle reaches the destination is longer than the estimated maximum time required for a download, the flag to perform the continuous download process may be set to on, instead of the flag to intermittent download process so that the download process is completed before the vehicle reaches the unsuitable section or after the vehicle passes through the unsuitable section.

In the above embodiment, an update program for the control program of an actuator is described as an example of an object to be downloaded. However, the object to be downloaded may be an update program for map information or control program for the navigation system 10, and is not particularly limited.

In the above embodiment, when the interruption process is performed, the vehicle 2 stops receiving data after the interruption process is completed. However, the data center 100 may stop transmitting data when it receives information indicating that the interruption process is completed from the vehicle 2.

In the above embodiment, the first and second sections are acquired when a destination is entered (that is, before the vehicle starts being driven). However, the first and second sections may be acquired after the vehicle starts being driven.

A part or all of the above modifications may be combined as appropriate. The embodiment disclosed herein should be construed as illustrative in all respects and not restrictive. The scope of the present disclosure is shown by the claims rather than by the above description and is intended to include all modifications within the meaning and scope equivalent to the claims.

What is claimed is:

1. A communication system comprising:
   a communication device configured to communicate with a server external to a vehicle; and
   a control device configured to
      control the communication device such that the vehicle receives predetermined data from the server,
      acquire a first range in which the data is able to be received and a second range in which the data is not received,
      control the communication device to receive the data while the vehicle is located in the first range, and
      control the communication device to interrupt the reception of the data in a resumable state of the reception while the vehicle is located in the second range.

2. The communication system according to claim 1, wherein the data is update data to update a software of the control device, and wherein the control device is mounted on the vehicle.

3. The communication system according to claim 1, wherein the control device is configured to control the communication device in such a manner that the reception of the data resumes after the vehicle passes through the second range.

4. The communication system according to claim 1, wherein the control device is configured to set the second range using area information including an area where communication by the communication device is possible and an area that is out of a communication range.

5. The communication system according to claim 1, wherein the control device is configured to perform the interruption process when a signal reception level of the communication device falls below a threshold while the vehicle is traveling in the first range.

6. A server comprising:
   a communication device configured to communicate with a vehicle; and
   a control device configured to
      control the communication device such that the vehicle receives predetermined data from the server,
      transmit the data while the vehicle is traveling in a first range in which the vehicle is able to receive data, and
      interrupt transmission of the data when information indicating that the vehicle completed an interruption process is received before the vehicle travels in a second range in which the vehicle does not receive data, the interruption process being a process of interrupting reception of the data in a resumable state.

7. The server according to claim 6, wherein the data is update data to update a software of the control device, and wherein the control device is mounted on the vehicle.

8. The server according to claim 6, wherein the control device is configured to control the communication device in such a manner that the reception of the data resumes after the vehicle passes through the second range.

9. The server according to claim 6, wherein the control device is configured to set the second range using area information including an area where communication by the communication device is possible and an area that is out of a communication range.

10. The server according to claim 6, wherein the control device is configured to perform the interruption process when a signal reception level of the communication device falls below a threshold while the vehicle is traveling in the first range.

11. A vehicle comprising:
    a communication device configured to communicate with a server external to the vehicle; and
    a control device configured to
       control the communication device such that the vehicle receives predetermined data from the server,
       acquire a first range in which the data is able to be received and a second range in which the data is not received,
       control the communication device to receive the data while the vehicle is located in the first range, and
       control the communication device to interrupt the reception of the data in a resumable state of the reception while the vehicle is located in the second range.

12. The vehicle according to claim 11, wherein the data is update data to update a software of the control device, and wherein the control device is mounted on the vehicle.

13. The vehicle according to claim 11, wherein the control device is configured to control the communication device in such a manner that the reception of the data resumes after the vehicle passes through the second range.

14. The vehicle according to claim 11, wherein the control device is configured to set the second range using area information including an area where communication by the communication device is possible and an area that is out of a communication range.

15. The vehicle according to claim 11, wherein the control device is configured to perform the interruption process when a signal reception level of the communication device falls below a threshold while the vehicle is traveling in the first range.

16. A method for controlling a communication system, the method comprising:
    providing the communication system according to claim 1,
    controlling the communication device such that the vehicle receives predetermined data from the server,
    acquiring a first range in which the data is able to be received and a second range in which the data is not received,
    controlling the communication device to receive the data while the vehicle is located in the first range, and controlling the communication device to interrupt the reception of the data in a resumable state of the reception while the vehicle is located in the second range.

17. A method for controlling a server, the method comprising:
providing the server according to claim 6,
controlling the communication device such that the vehicle receives predetermined data from the server,
transmitting the data while the vehicle is traveling in a first range in which the vehicle is able to receive data, and
interrupting transmission of the data when information indicating that the vehicle completed an interruption process is received before the vehicle travels in a second range in which the vehicle does not receive data, the interruption process being a process of interrupting reception of the data in a resumable state.

18. A method for controlling a vehicle, the method comprising:
providing the vehicle according to claim 11,
controlling the communication device such that the vehicle receives predetermined data from the server,
acquiring a first range in which the data is able to be received and a second range in which the data is not received,
controlling the communication device to receive the data while the vehicle is located in the first range, and
controlling the communication device to interrupt the reception of the data in a resumable state of the reception while the vehicle is located in the second range.

19. A non-transitory storage medium storing instructions that are executable by one or more processors and that cause the one or more processors to perform functions comprising the method according to claim 17.

20. A non-transitory storage medium storing instructions that are executable by one or more processors and that cause the one or more processors to perform functions comprising the method according to claim 18.

* * * * *